United States Patent [19]

Okanoue

[11] Patent Number: 5,224,127
[45] Date of Patent: Jun. 29, 1993

[54] DIGITAL DATA COMMUNICATION SYSTEM

[75] Inventor: Kazuhiro Okanoue, Tokyo, Japan

[73] Assignee: NEC Corporation, Tokyo, Japan

[21] Appl. No.: 678,519

[22] Filed: Apr. 1, 1991

[30] Foreign Application Priority Data

Mar. 30, 1990 [JP] Japan ................................. 2-85638
Mar. 30, 1990 [JP] Japan ................................. 2-85640

[51] Int. Cl.$^5$ ............................................ H04L 27/6
[52] U.S. Cl. ...................................... 375/96; 375/94; 371/43
[58] Field of Search ............................ 375/94, 96, 103; 371/43, 44, 45, 46

[56] References Cited

U.S. PATENT DOCUMENTS 4,885,757  12/1989  Provence ............................. 375/96
4,905,317  2/1990   Suzuki et al. ........................ 371/43
5,081,651  1/1992   Kubo ................................... 371/43

FOREIGN PATENT DOCUMENTS 2189669  10/1987  United Kingdom .

OTHER PUBLICATIONS

IEEE Transactions on Communications, vol. 37, No. 9, Sep. 1989, New York US pp. 918-926, Clark A. P. et al., "Adaptive Channel Estimator for an HF Radio Link".
IEEE Transactions on Information Theory, vol. IT-19, No. 1, Jan. 1973, New York US pp. 120-124, Magee F. R. et al., "Adaptive Maximum Liklihood Sequence Estimation for Digital Signaling in the Presence of Intersymbol Interference".
IEEE International Conference on Communications, vol. 2, Jun. 1978, Toronto, Canada, pp. 3031-3035, Divsalar D. et al., "Performance of Intersymbol Interference Channels Under Mismatch Conditions".
Signal Processing, vol. 2, No. 1, Jan. 1980, Amsterdam NL pp. 39-53; Clark A. P. et al., "Estimation of the Sampled Impulse Response of a Channel".
Electronics Letters, vol. 26, No. 19, Sep. 1990, Stevenage, Herts., GB pp. 1572-1573; Dahlman E., "New Adaptive Viterbi Detector for Fast-Finding Mobile-Radio Channels".

*Primary Examiner*—Curtis Kuntz
*Assistant Examiner*—Young Tse
*Attorney, Agent, or Firm*—Sughrue, Mion, Zinn, Macpeak & Seas

[57] ABSTRACT

A digital data communication system for transmitting data over a transmission channel. The system is capable of estimating a channel impulse response with high reliability even when the channel is time-varying and suffers from intersymbol interference. Even when the variation on the channel is rapid, the system reduces the influence of demodulation delay particular to a maximum likelihood sequence estimator and thereby realizes highly reliable data transmission.

6 Claims, 8 Drawing Sheets

DIGITAL DATA COMMUNICATION SYSTEM

BACKGROUND OF THE INVENTION

The present invention relates to a digital data communication system and, more particularly, to an adaptive channel impulse response estimation system for estimating an impulse response reliably at the receiving side of a channel which varies with time and suffers from distortions due to intersymbol intereference and an adaptive maximum likelihood sequence estimation (MLSE) system for demodulating received data correctly by reducing the influence of demodulation delay.

In digital communication over a channel which varies with time and suffers from intersmbol interference as mentioned above, the receiving side needs an adaptive equalizer adapting itself to the characteristic of the channel to demodulate received data correctly. If the impulse response of the channel is known, the adaptive equalizer can be constructed to satisfy a predetermined characteristic. It is therefore necessary to estimate the impulse response of the time-varying channel from a received signal, so that the equalizer may follow the channel. A conventional implementation for estimating a channel impulse response from a received signal consists in applying the output of a decision unit to a replica generating filter which generates a replica of a received signal and is implemented as a transversal filter, comparing the replica with the actual received signal, and controlling the tap coefficients of the filter in such a manner as to reduce a difference therebetween, as disclosed in, for example, Proakis "Digital Communications", McGraw-Hill, 1983 (referred to as PRIOR ART I hereinafter). In this kind of system, the tap coefficients of the replica generating filter are outputted as an estimated channel impulse response, and an adaptive equalizer is controlled in matching relation to the estimated channel impulse response. However, estimating a channel impulse response from a decision result is disadvanageous in that a decision error would cause the replica generating filter to diverge and thereby render the operation of the adaptive equalizer itself unstable, resulting in error propagation.

To reduce decision errors, the adaptive equation system may be implemented by MLSE using Viterbi algorithm, as taught in, for example, Hayes "The Viterbi Algorithm Applied to Digital Data Transmission", IEEE, Communication Society, 1975, No. 13 (hereinafter referred to as PRIOR ART II). This scheme successfully reduces decision errors and, therefore, stabilizes the operation of the replica generating filter so long as the channel varies slowly. However, when the channel variation is rapid, the ability of the filter to follow the channel variation is degraded due to demodulation delay particular to the MLSE scheme with the result that the decision error is aggravated.

Even linear equation or decision feedback equation cannot eliminate the above-discussed problems since the estimated channel impulse response achievable therewith is unstable.

SUMMARY OF THE INVENTION

It is therefore an object of the present invention to provide a digital data communication system which allows the receiving side to demodulate received data correctly even when the channel varies with time and suffers from distortions due to intersymbol interference.

It is another object of the present invention to provide an adaptive channel impulse response estimation system which allows the receiving side to estimate a channel impulse response reliability even when the channel varies with time and suffers from distortions due to intersymbol interference.

It is another object of the present invention to provide an adaptive MLSE system which allows the receiving side to demodulate received data correctly and reliably even when the channel varies with time rapidly and suffers from distortions ascribable to intersymbol interference.

In accordance with the present invention, an MLSE system for a digital data communication system which transmits data over a transmission channel comprises a circuit for estimating an MLS on the basis of a received signal and a predicted future channel impulse response applied thereto, and outputting the result of estimation, a circuit for generating a replica of the received signal on the basis of the result of estimation and internal states thereof, producing a difference between the received signal and the replica, changing the internal states in a direction for reducing the difference, and outputting the result of change, and a circuit for predicting a future channel impulse response on the basis of the result of change applied thereto by using the result of change as a past change in internal states, and outputting the result of prediction.

Also, in accordance with the present invention, an adaptive MLSE apparatus using Viterbi algorithm and applicable to a digital data communication system which transmits data over a transmission channel comprises a matched filter to which a received signal and a predicted future channel impulse response are applied, a branchmetric compute circuit for calculating, in response to the predicted future channel impulse response and an output of the matched filter, a branchmetric of the received signal and outputting the branchmetric, an add, compare and select (ACS) circuit for estimating an MLS in response to an output of the branchmetric compute circuit, and outputting the result of estimation, a delay circuit for delaying the received signal by a demodulation time in which the result of estimation is outputted, a received signal regenerating filter for regenerating and outputting the received signal in response to an output of the ACS circuit, a filter control circuit for updating, in response to an output of the delay circuit, an output of the received signal regenerating filter, and internal states of the received signal regenerating filter, the internal states of the received signal regenerating filter such that a difference between the output of the delay circuit and that of the received signal regenerating filter decreases, and a channel impulse response predict circuit for predicting, in response to an output of the received signal regenerating filter control circuit and by using the output as a past change in the internal states of the received signal regenerating filter, a future path impulse response and outputting the result of prediction as the predicted future channel impulse response.

Further, in accordance with the present invention, an adaptive channel impulse response estimation system for a digital data communication system which transmits data over a transmission channel comprises a first internal state output circuit for generating, in response to a result of decision, a received signal and an estimated channel impulse response, a replica of the received signal and outputting first internal states, a control pulse output circuit for detecting a decision error in response to the first internal states and, when detected a decision error, outputting a control pulse, a second internal state output circuit for replacing, in response to the received signal and first internal states, the first internal states with second internal states to control error propagation when the control pulse output circuit has outputted the control pulse and outputting the second internal states, or outputting the first internal states as the second internal states without replacement when the control pulse output circuit does not output the control signal, and an estimated value output circuit for updating the second internal states to output the estimated channel impulse response.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the digital data communication system in accordance with the present invention will be described with reference to the accompanying drawings.

First Embodiment

Figure 1:
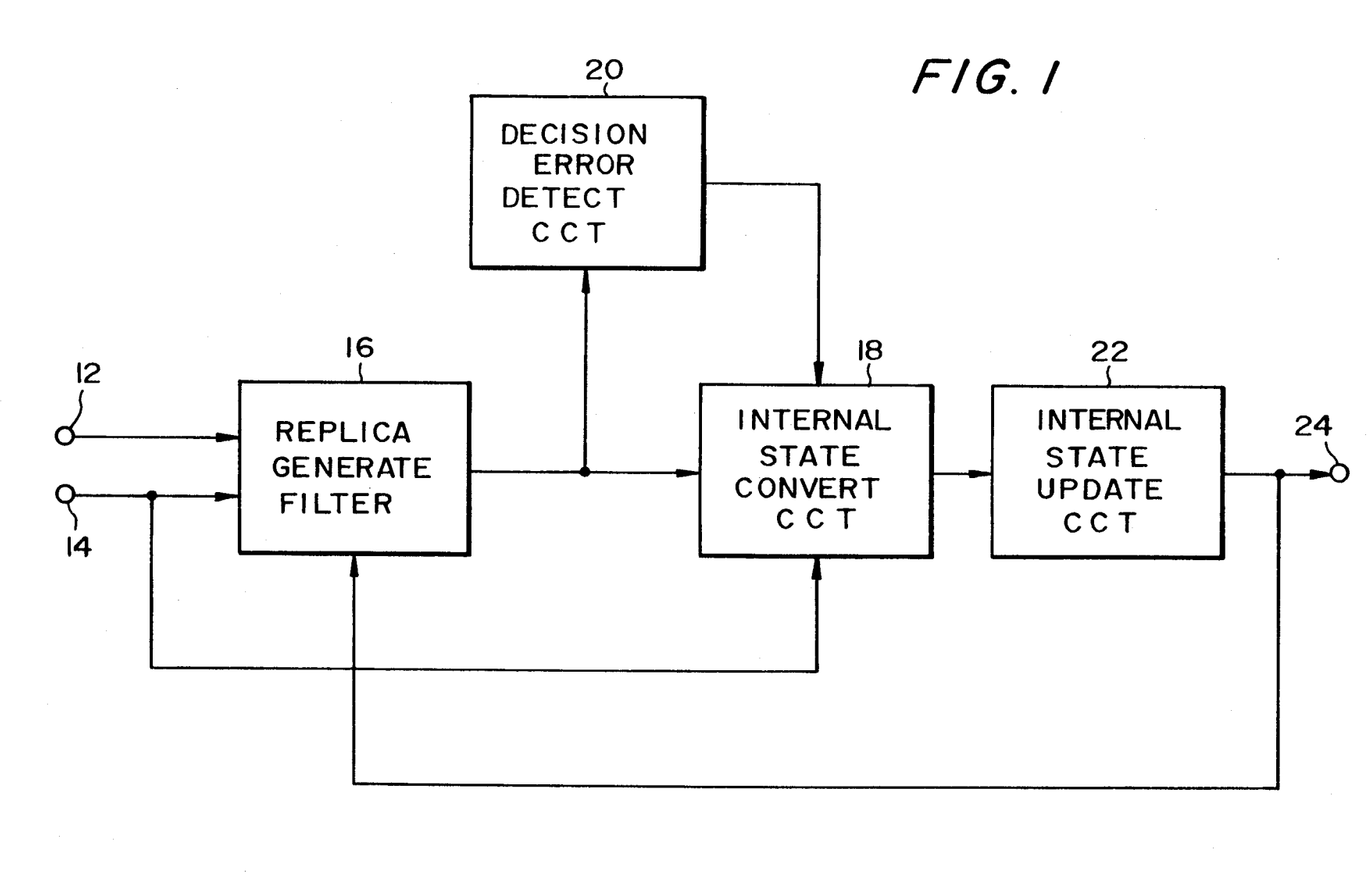
FIG. 1 is a block diagram schematically showing an adaptive channel impulse response estimation system representative of a first embodiment of the present invention.
Figure 2:
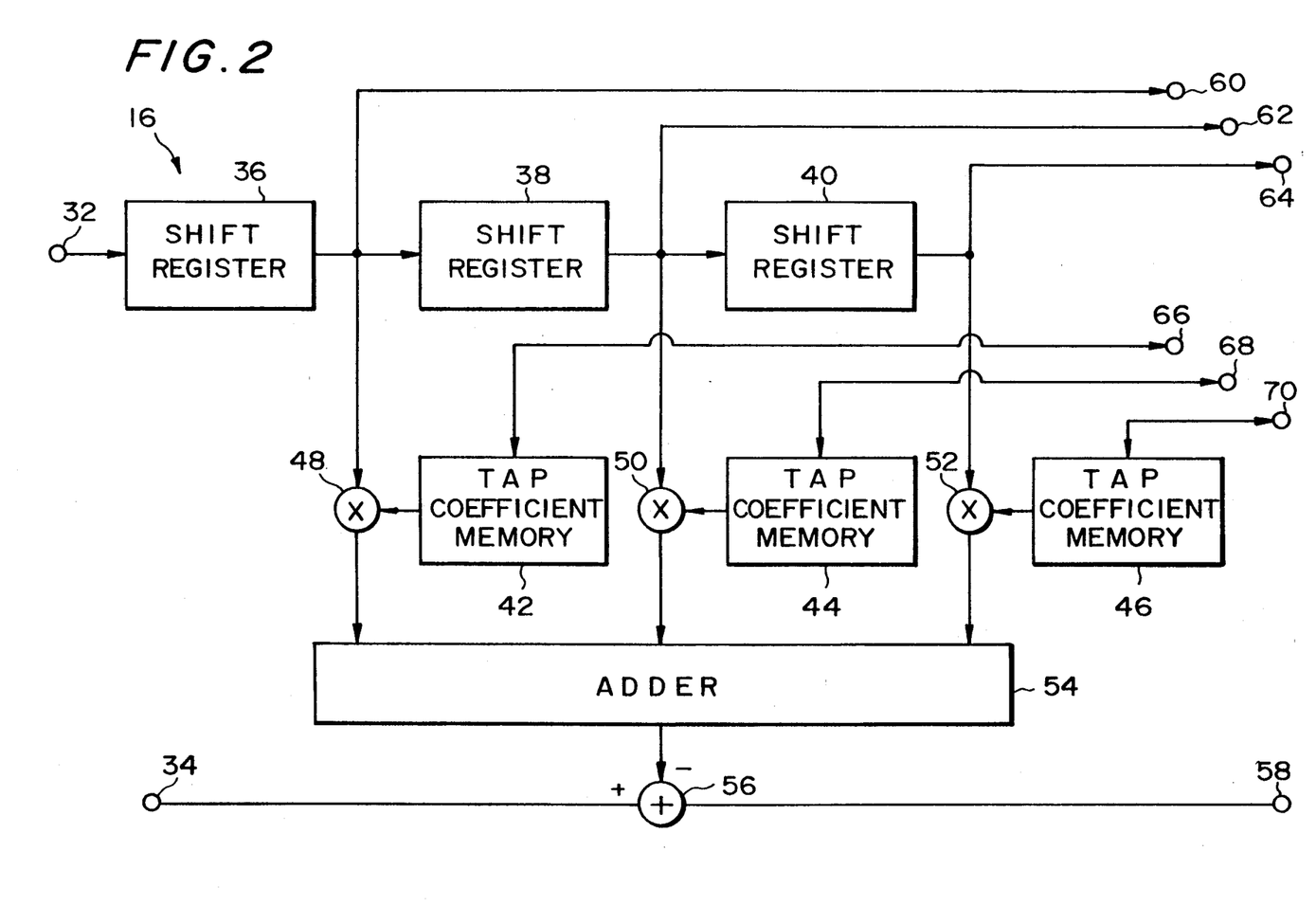
FIG. 2 is a block diagram schematically showing a specific construction of a replica generating filter included in the embodiment.

Referring to FIG. 1 of the drawings, a first embodiment pertaining to the adaptive channel impulse response estimation system will be described. As shown, the system has input terminals 12 and 14, a replica generating filter 16 for generating a replica of a received signal, an internal state convert circuit 18, a decision error detect circuit 20, an internal state update circuit 22, and an output terminal 24. A signal representative of the result of decision is applied via the input terminal 12 to the replica generating filter 16. The received signal is applied via the input terminal 14 to the replica generating filter 16 and internal state convert circuit 18. As shown in FIG. 2, the filter 16 may be implemented as a 3-tap transversal filter having an input terminal 32 which is supplied with the signal of the result of decision and an input terminal 34 which is supplied with the received signal, shift registers 36, 38 and 40, tap coefficient memories 42, 44 and 46, multipliers 48, 50 and 52, an adder 54, a subtractor 56, output terminals 58, 60, 62 and 64, and input/output terminal 66, 68 and 70. The tap coefficients of the transversal filter 16, i.e., the outputs appearing on the input/output terminals 66, 68 and 70 are the estimated values of channel impulse response. The tap coefficients, signals stored in the registers 36, 38 and 40, i.e., outputs appearing on the output terminals 60, 62 and 64, and an error signal, i.e., output appearing on the output terminal 58 define the internal states of the filter 16.

In response to the input signal, the replica generating filter 16 outputs the current internal state thereof to the internal state convert circuit and decision error detect circuit 20. The decision error detect circuit 20 determines whether or not a decision error has occurred on the basis of the internal states. On determining that a decision error has occurred, the detecting circuit 20 feeds a start control pulse to the internal state convert circuit 18. In response to the control pulse, the convert circuit 18 converts the internal states on the basis of the received signal from the input terminal 14 and the internal states of the filter 16 in such a manner as to eliminate error propagation. The result of conversion is applied to the internal state update circuit 22. When the start control pulse is not applied from the detect circuit 20 to the convert circuit 18, the convert circuit 18 outputs the internal states of the filter 16 without converting them. On receiving the internal states, the update circuit 22 feeds updated values of tap coefficients to the filter 16 while feeding the estimated channel impulse response values, i.e., updated tap coefficients to the output terminal 24.

Second Embodiment

Figure 3:
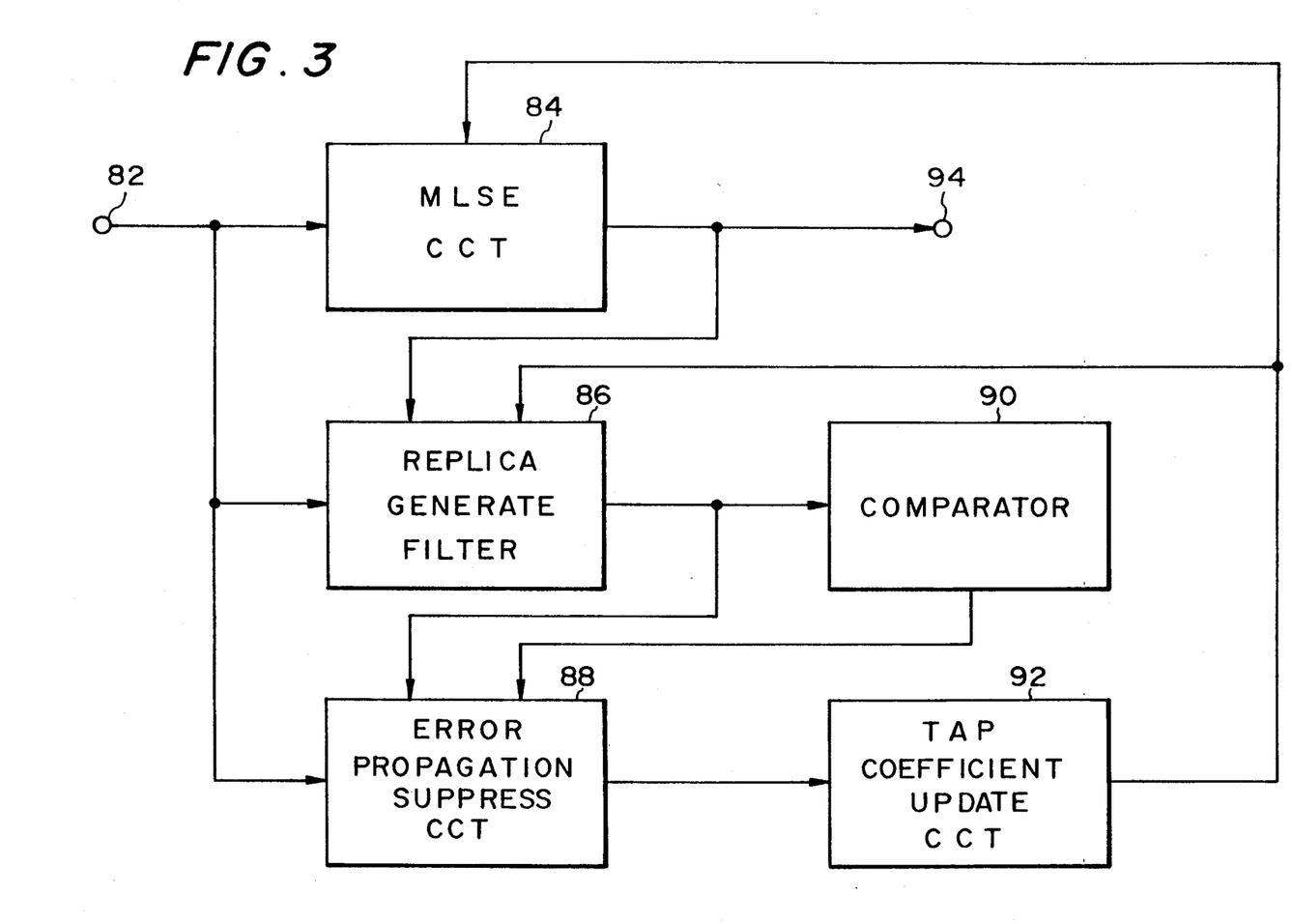
FIG. 3 is a block diagram schematically showing an adaptive channel impulse response estimation system representative of a second embodiment of the present invention which is applied to an MLSE system.

An alternative embodiment of the present invention is shown in FIG. 3 and implemented by applying the adaptive channel impulse response estimation system to the MLSE system. As shown, the system has an input terminal 82, an MLSE circuit 84, a replica generating filter 86, an error propagation suppress circuit 88, a comparator 90, a tap coefficient updatae circuit 92, and an output terminal 94. The replica generating filter 86, error propagation suppress circuit 88, comparator 90 and tap coefficient update circuit 92 constitute the gist of this embodiment. The filter 86 may also be implemented as a 3-tap transversal filter, as shown in FIG. 2.

A received signal arrived at the input terminal 82 is applied to the MLSE circuit 84, replica generating filter 86, and error propagation suppress circuit 88. Generally, when the MLSE circuit 84 involves demodulation delay, it is necessary to delay the received signal by the demodulation delay before feeding it to the filter 86 and suppress circuit 88. In the following description, let the demodulation delay in the MLSE circuit 84 be assumed to be zero. The MLSE circuit 84 executes MLSE with the received signal and applies the result of estimation to the output terminal 94 and filter 86. In response, the filter 86 produces a signal representative of a difference between the received signal come in through the input terminal 82 and a received signal replica which the filter 86 generates. In this embodiment, the internal states (decision pattern) of the shift registers 36, 38 and 40 appearing on the output terminals 60, 62 and 64, FIG. 2, tap coefficients appearing on the input/output terminals 66, 68 and 70, FIG. 2, and the error signal appearing on the output terminal 58, FIG. 2 are representative of the internal states of the filter 86. The filter 86 delivers such an internal states to the error propagation suppress circuit 88 and comparator 90. The comparator 90 detects, among the input internal states, the level of the error signal and compares it with a predetermined threshold level which exceeds, for example, a decision range. If the level of the error signal is higher than the threshold level, the comparator 90 feeds a start control pulse to the error propagation suppress circuit 88 determining that a decision error has occurred. In response to the control pulse, the suppress circuit 88 converts the internal states from the filter 86 in such a manner as to suppress error propagation and then outputs the result of conversion.

Figure 4:
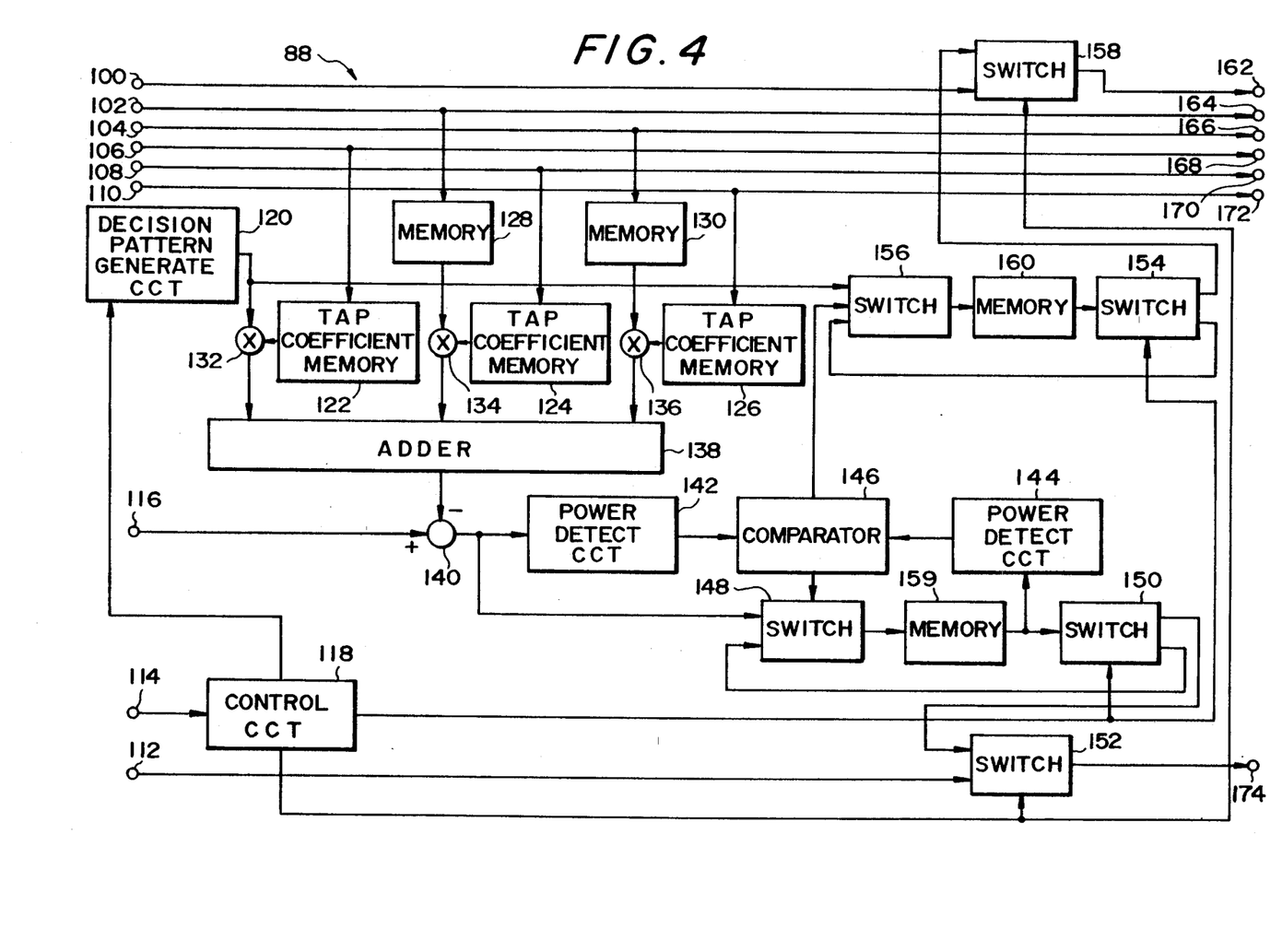
FIG. 4 is a block diagram schematically showing a specific construction of a propagation error suppress circuit included in the second embodiment.

FIG. 4 shows a specific construction of the error propagation suppress circuit 88. The construction of FIG. 4 is applicable to a case wherein the filter 86 has three taps as shown in FIG. 2, i.e., the number n of shift registers is "3", while the decision pattern generate circuit 120 is assumed to generate all the possible decision patterns which may occur in mT, i.e., m is assumed to be "1". Generally, the construction is extendible even when n and m each has any other value. In FIG. 4, there are shown input terminals 100, 102, 104, 106, 108, 110, 112, 114 and 116, a control circuit 118, a decision pattern generate circuit 120, tap coefficient memories 122, 124 and 126, memories 128 and 130 for storing signals of shift registers, multipliers 132, 134 and 136, an adder 138, a subtractor 140, power detect circuits 142 and 144, a comparator 146, switches 148, 150, 152, 154, 156 and 158, memories 159 and 160, and output terminals 162, 164, 166, 168, 170, 172 and 174.

The internal states from the filter 86 are applied to the input terminals 100, 102, 104, 106, 108, 110 and 112. Specifically, signals on the output terminals 60, 62 and 64, FIG. 2, are respectively applied to the input terminals 100, 102 and 104, signals on the output terminals 66, 68 and 70, FIG. 2, are respectively applied to the input terminals 106, 108 and 110, and the signal on the output terminal 58, FIG. 2, is applied to the input terminal 112. Applied to the input terminals 114 and 116 are the control pulse from the comparator 90 and the received signal, respectively. On receiving the control pulse via the input terminal 114, the control circuit 118 delivers a start control signal to the decision result pattern generate circuit 120. The control circuit 118 feeds control signals to the switches 150 and 154 and thereby causes them to deliver input signals to, respectively, the switches 148 and 156 as initial states. When the decision pattern generate circuit 120 completes processing, the control circuit 118 causes the switches 150 and 154 to deliver input signals to the switches 152 and 158, respectively. Further, the control circuit 118 applies control signals to the switches 152 and 158 to cause them to output the signals from the switches 150 and 154, respectively. The switches 152 and 158 outputs respectively the signals from the input terminals 112 and 100 when not supplied with the control signals from the control circuit 118.

In response to the control signal from the control circuit 118, the decision pattern generate circuit 120 generates all of mT possible decision patterns. In the embodiment, m is assumed t be "1". For this reason, one switch 154, one switch 156, one switch 158 and one memory 160 are provided. The decision patterns are fed from the decision pattern generate section 120 to the multiplier 132. The internal states of the filter 86 are stored in the memories 128 and 130. The multipliers 132, 134 and 136 and adder 138 weight the signals stored in the memories 128 and 130 and the signal from the decision pattern generate circuit 120 by the signals stored in the tap coefficients memories 122, 124 and 126 and then add the weighted signals. The subtractor 140 produces a signal representative of a difference between the output of the adder 138 and the received signal come in through the input terminal 116. This output of the subtractor 140 is fed to the power detect circuit 142 and switch 148. Initially, the switch 148 is so set as to select the output of the subtractor 140 and apply it to the memory 159. The memory 159 usually delivers the content thereof to the switch 150 and power detect circuit 144.

The power detect circuit 144 detects the power of the input signal and feeds it to the comparator 146. In response, the comparator 146 selects smaller one of the outputs of the power detecting circuits 142 and 144. The comparator 146 controls the switch 148 such that if the output of the power detect circuit 144 is smaller than that of the power detect circuit 142, the output of the switch 150 is fed to the memory 159 or, if otherwise, the output of the subtractor 140 is fed to the memory 159. As a result, the memory 159 stores an error signal minimizing the power at all times. At the same time, the comparator 146 controls the switch 156 such that if the output of the power detect circuit 142 is smaller than that of the power detect circuit 144, the output of the decision pattern generate circuit 120 is fed to the memory 160 or, if otherwise, the output of the switch 154 is fed to the memory 160. Initially, the switch 156 is so set as to select the output of the decision pattern generated circuit 120. Then, the memory 160 always stores a decision pattern which provides the minimum error signal power.

By the above procedure, when a control pulse is fed from the comparator 146 to the control circuit 118, internal states converted in such a manner as to suppress error propagation are caused to appear on the output terminals 160, 162, 164, 166, 168, 170, 172 and 174. When the control signal is not fed to the control circuit 118, the input internal states are outputted without being converted at all.

The internal states undergone conversion as stated above are transferred to the tap coefficient update circuit 92. Assume that the filter 86 and the error propagation suppress circuit 88 have the specific constructions shown in FIGS. 2 and 4, respectively. Then, the tap coefficients of the filter 86 applied to the output terminals 162, 164 and 166, FIG. 4, are the estimated values of the path impulse response at a time K−1. The update circuit 92 determines tap coefficients at a time k by using the converted internal states and algorithm such as LMS algorithm taught in the previously state PRIOR ART I. Such tap coefficients are applied to the MLSE circuit 84 and filter 86. The MLSE circuit 84 and filter 86 each continues adaptive oeprations while updating the internal states thereof in response to the output of the update circuit 92.

Third Embodiment

Figure 5:
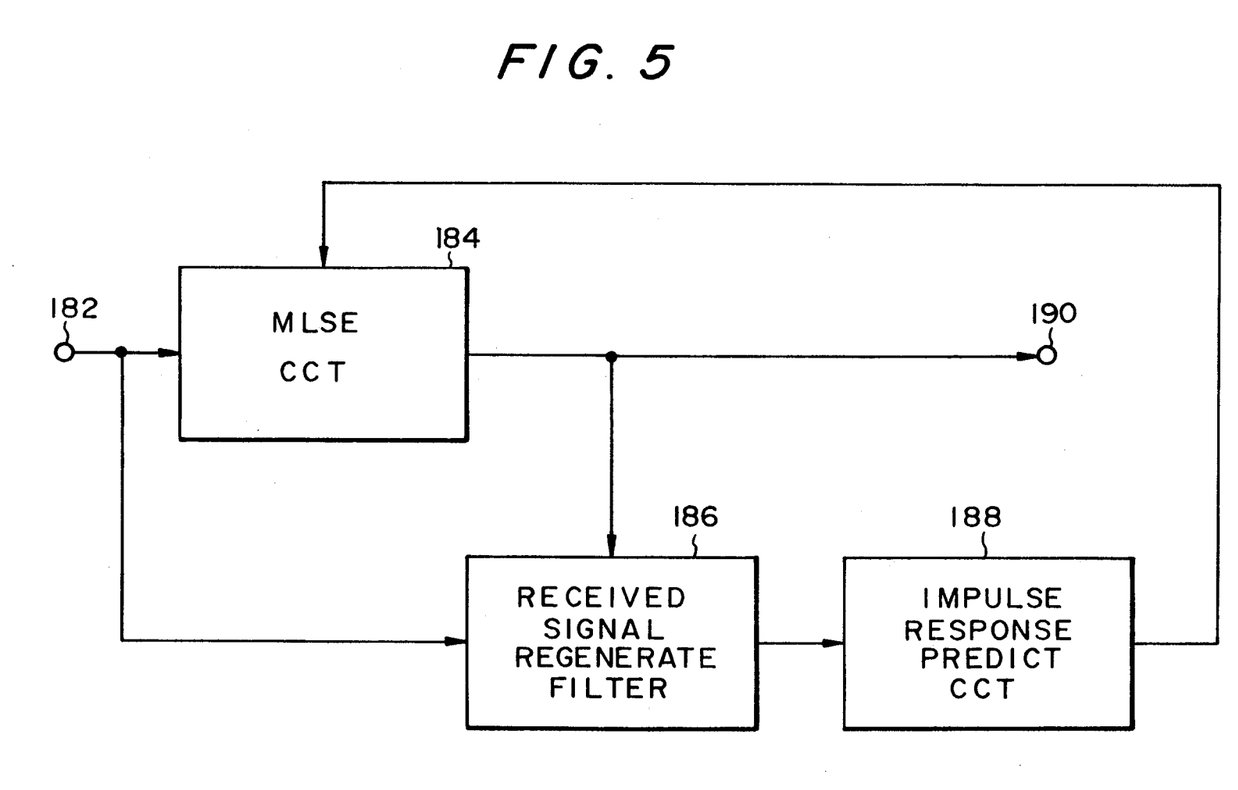
FIG. 5 is a schematic block diagram of an adaptive MLSE system which is a third embodiment of the present invention.

Referring to FIG. 5, a third embodiment of the present invention pertaining to the adaptive MLSE system will be described. As shown, the system has an input terminal 182, an MLSE circuit 184, a received signal regenerating filter 186, a channel impulse response predict circuit 188, and an output terminal 190. A received signal is applied to the MLSE circuit 184 and received signal regenerating filter 186 via the input terminal 182. The MLSE circuit 184 executes MLSE with the received signal and feeds the result of estimation to the output 190 and filter 186. The filter 186 generates a replica of the received signal on the basis of the result of estimation and the internal states thereof. Further, the filter 186 compares the received signal come in through the input terminal 182 and the replica and updates the internal states thereof in such a manner as to reduce their difference or error. The updated states of the filter 186 are fed to the channel impulse response predict circuit 188. In response, the predict circuit 188 predicts a future channel impulse response and delivers the result of prediction to the MLSE circuit 184. In response, the MLSE circuit 184 changes the internal states thereof in matching relation to the future channel impulse response.

Fourth Embodiment

Figure 6:
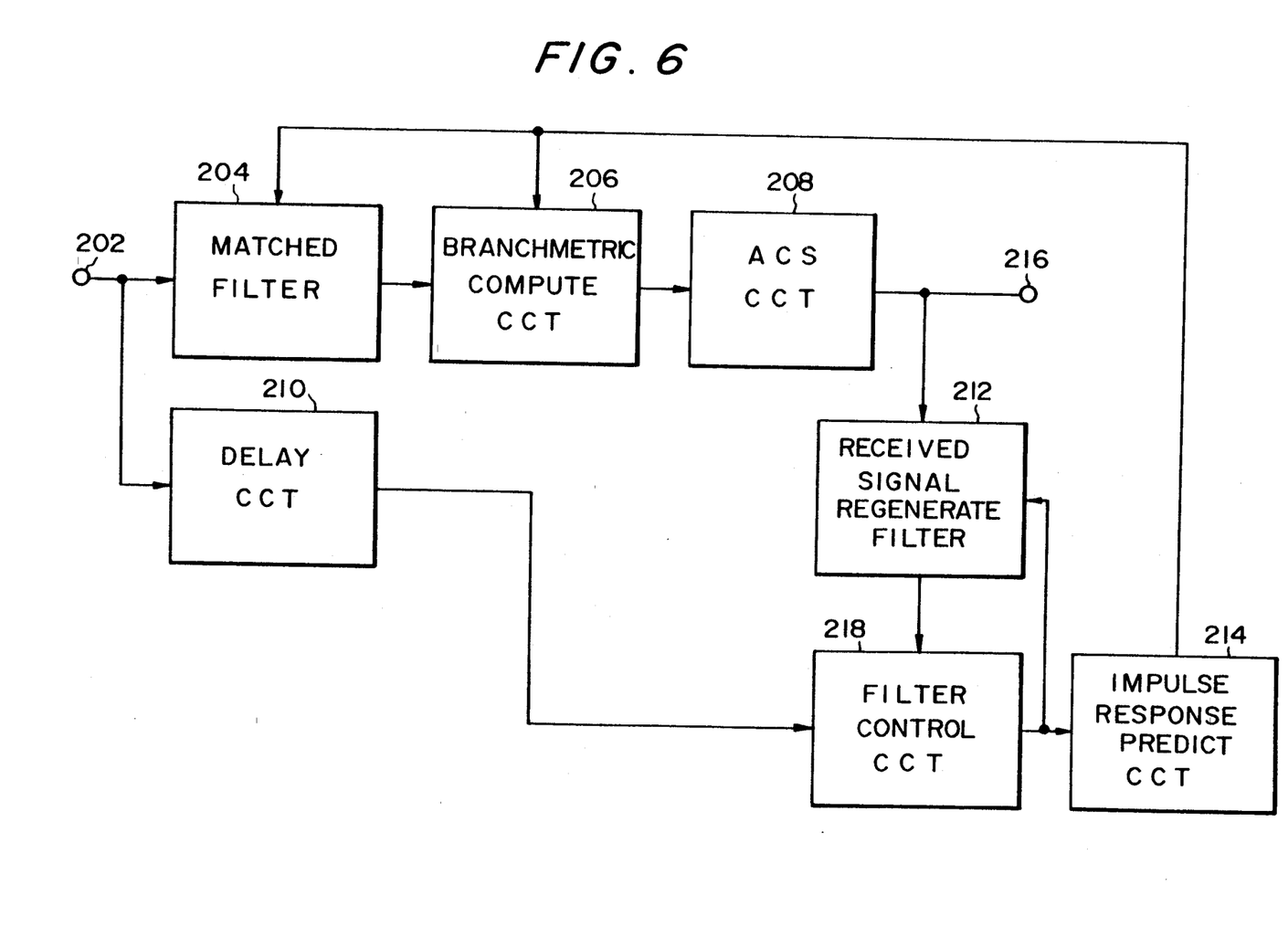
FIG. 6 is a schematic block diagram an adaptive MLSE system representative of a fourth embodiment of the present invention.

FIG. 6 shows a fourth embodiment of the present invention which is concerned with the adaptive MLSE system. In FIG. 6, there are shown an input terminal 202, a matched filter 204, a branchmetric compute circuit 206, an add, compare and select (ACS) circuit 208, a delay circuit 210, a received signal regenerating filter 212, a channel impulse response predict circuit 214, an output terminal 216, and a filter control circuit 218. The matched filter 204, banchmetric compute circuit 206 and ACS circuit 208 constitute in combination an MLSE circuit using Viterbi algorithm. The matched filter 204 and branchmetric compute circuit 206 each has dependency on channel impulse response (see PRIOR ART II). The received signal from the input terminal 202 is applied to the MLSE circuit constituted by the matched filter 204, branchmetric compute circuit 206, and ACS circuit 208, and to the delay circuit 210. The ACS circuit 208 delivers the MLSE result to the regenerating filter 212. The replica of the received signal and the internal states of the regenerating filter 212 are applied to the filter control circuit 218. Also applied to the filter control circuit 218 is the received signal having been delayed by an MLSE modulation time by the delay circuit 210. Assuming that the channel impulse response has a length of "3", then the filter 212 and the filter control circuit 218 may be implemented as a transversal filter and a processor, as shown in FIG. 7.

Figure 7:
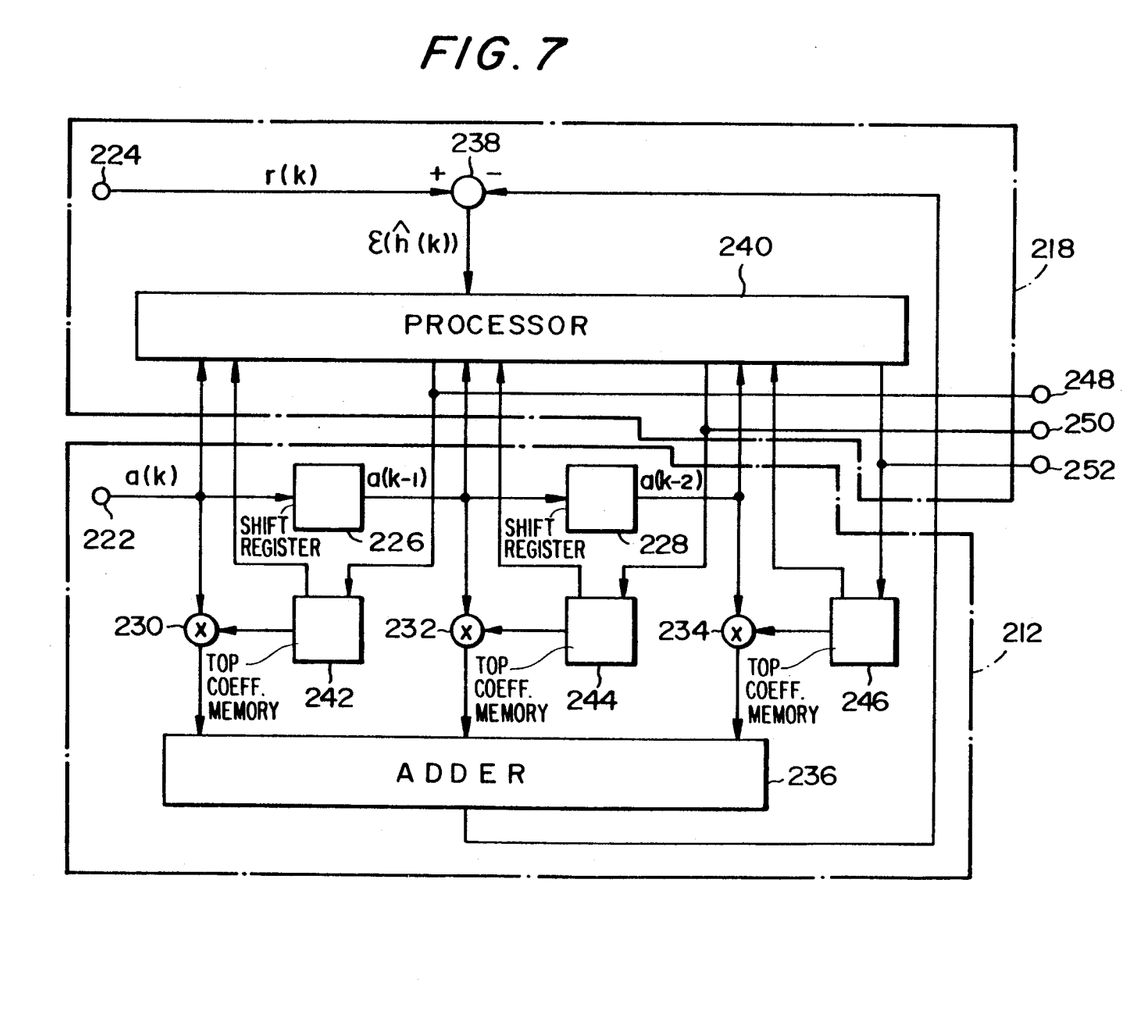
FIG. 7 is a block diagram schematically showing a specific construction of a regenerating filter and a filter control circuit included in the fourth embodiment.

In FIG. 7, there are shown input terminals 222 and 224, shift registers 226 and 228, multipliers 230, 232 and 234, an adder 236, a subtractor 238, a processor 240, memories 242, 244 and 246 for channel impulse response values $\hat{h}_0(k)$, $\hat{h}_1(k)$ and $\hat{h}_2(k)$, respectively, and output terminals 248, 250 and 252. The estimated channel impulse response values memorized in 242, 244 and 246 and the contents of the shift registers 226 and 228 are the internal states of the regenerating filter 212. At a time k, the result of decision a (k) from the ACS circuit 208 is applied to the input terminal 222. The multipliers 230, 232 and 234 multiply the results of decision a (k−2) to a (k) by the channel impulse response values $\hat{h}_0(k)$ to $\hat{h}_2(k)$ estimated at the time k, while the adder 236 adds the resulted products. As a result, a replica of the kth received signal r (k) appears on the output of the adder 236. On the other hand, a received signal r (k) delayed by the delay circuit 210 arrives at the input terminal 224. The subtractor 238 produces a difference or error $\epsilon$ ($\hat{h}$ (k)) between the received signal r(k) and the output of the adder 236 and delivers it to a processor 240. By using an adaptation algorithm, the processor 240 updates the channel impulse response values $\hat{h}_0(k)$ to $\hat{h}_2(k)$ such that the square mean, for example, of the error $\epsilon$ ($\hat{h}$ (k)) becomes minimum. When use is made of LMS algorithm as the adaptation algorithm, the processor 240 updates $\hat{h}_0(k)$ to $\hat{h}_2(k)$ by the following calculations:

$$\hat{h}_0(k+1) = \hat{h}_0(k) + \Delta \cdot \epsilon(\hat{h}(k)) \cdot a(k)^*$$

$$\hat{h}_1(k+1) = \hat{h}_1(k) + \Delta \cdot \epsilon(\hat{h}(k)) \cdot a(k-1)^*$$

$$\hat{h}_2(k+1) = \hat{h}_2(k) + \Delta \cdot \epsilon(\hat{h}(k)) \cdot a(k-2)^*$$

where $\Delta$ is the step size and * is the complex conjugate.

The processor 240 delivers resulted $\hat{h}_0(k+1)$, $\hat{h}_1(k+1)$ and $\hat{h}_2(k+1)$ to the memories 242, 244 and 246, respectively, and to the output terminals 248, 250 and 252 as an estimated impulse response.

It will be seen from the above that the received signal regenerating filter 212 can estimate only the path impulse response delayed by the modulation delay of the MLSE circuit 184. To correct the delay, the output of the filter control circuit 218 is applied to the channel impulse response predict circuit 214.

Figure 8:
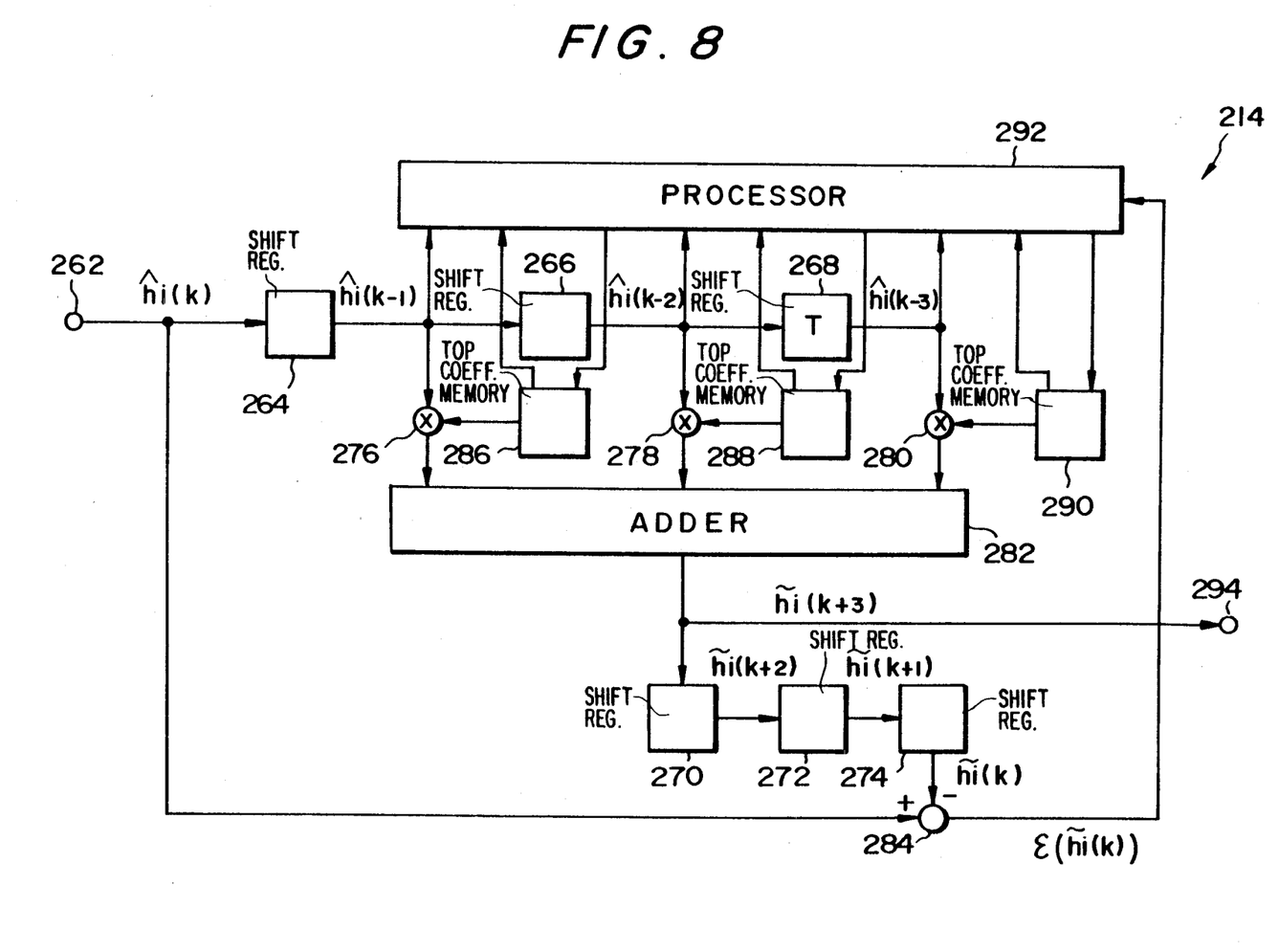
FIG. 8 is a block diagram showing a specific construction of an impulse response predict circuit included in the construction of FIG. 7.

As shown in FIG. 8 specifically, the channel impulse response predict circuit 214 may be constituted by a 3-tap transversal filter and a processor. The arrangement shown in FIG. 8 has an input terminal 262, shift registers 264, 266, 268, 270, 272 and 274, multipliers 276, 278 and 280, an adder 282, a subtractor 284, tap coefficient memories 286, 288 and 290, a processor 292, and an output terminal 294. The output signal $\hat{h}_i(k)$ (i=0, 1, 2) of the filter control circuit 218 is applied to the input terminal 262. The shift registers 264, 266 and 268 store past estimated channel impulse response values $\hat{h}_i(k-1)$, $\hat{h}_i(k-2)$ and $\hat{h}_i(k-3)$, respectively. The multipliers 276, 278 and 280 multiply respectively such impulse response values $\hat{h}_i(k-1)$, $\hat{h}_i(k-2)$ and $\hat{h}_i(k-3)$ by the tap coefficients of the tap coefficient circuits 286, 288 and 290, while the adder 282 adds the resulted products. The output of the adder 282 is fed to the output terminal 294 and shift register 270 as a predicted path impulse response value $\hat{h}_i(k+3)$ 3T ahead. As a result, the shift registers 270, 272 and 274 shift the contents thereof, i.e., the past predicted channel impulse response values $\hat{h}_i(k+2)$, $\hat{h}_i(k+1)$ and $\hat{h}_i(k)$. The subtractor 284 produces a difference or error $\epsilon$ ($\tilde{h}_i(k)$) between the output $\hat{h}_i$ of the shift register 274 and the predicted past impulse response value $\hat{h}_i(k)$ fed from the input terminal 262 and feeds it to the processor 292.

In response, the processor 292 updates tap coefficients $P_0(k)$ $P_1(k)$ and $P_2(k)$ by using an adaptation algorithm such that the square mean, for example, of the error $\epsilon$ ($\tilde{h}_i(k)$) becomes smallest. Assuming that use is made of MLS algorithm as the adaptation algorithm, the processor 292 updates the above-mentioned tap coefficients, as follows:

$$P_0(k+1) = P_0(k) + \Delta \cdot \epsilon(\tilde{h}_i(k)) \cdot \hat{h}_i(k-1)^*$$

$$P_1(k+1) = P_1(k) + \Delta \cdot \epsilon(\tilde{h}_i(k)) \cdot \hat{h}_i(k-2)^*$$

$$P_2(k+1) = P_2(k) + \Delta \cdot \epsilon(\tilde{h}_i(k)) \cdot \hat{h}_i(k-3)^*$$

where $\Delta$ is the step size and * is the complex conjugate.

By updating the tap coefficients $P_0(k)$, $P_1(k)$, $P_2(k)$ as stated above, it is possible to predict how the channel impulse response will change and, therefore, the current channel impulse response on the basis of the past estimated impulse response values.

As described above, the illustrative embodiment predicts the current channel impulse response on the basis of the past estimated channel impulse response and causes the matched filter 204 and branchmetric compute circuit 206 to change adaptively by using the predicted value. This is successful in reducing the influence of demodulation delay particular to the MLSE system and, therefore, in realizing highly reliable demodulation.

In summary, it will be seen that the present invention provides a digital data communication system which estimates a channel impulse response reliably even when the transmission channel is time-varying and suffers from intersymbol interference. In addition, even when the variation rate on the channel is high, the influence of demodulation delay occurring in an MLSE estimator is reduced to implement highly reliable data transmission.

Various modifications will become possible for those skilled in the art after receiving the teachings of the present disclosure without departing from the scope thereof.

What is claimed is:

1. An adaptive maximum likelihood sequence estimation (MLSE) system for a digital data communication system which transmits data over a transmission channel, comprising:
   means for estimating a maximum likelihood sequence (MLS) on the basis of a received signal and a predicted future channel impulse response applied thereto, and outputting a result of estimation;
   means for generating a replica of said received signal on the basis of said result of estimation and internal states thereof, producing a difference between said received signal and said replica, changing said internal states in a direction for reducing said difference, and outputting a result of change; and
   means for predicting a future channel impulse response on the basis of said result of change applied thereto by using said result of change as a past change in internal states, and outputting a result of prediction.

2. An adaptive MLSE apparatus using Viterbi algorithm and applicable to a digital data communication system which transmits data over a transmission channel, comprising:
   a matched filter to which a received signal and a predicted future channel impulse response are applied;
   branchmetric compute circuit means for calculating, in response to said predicted future channel impulse response and an output of said matched filter, a branchmetric of said received signal and outputting said branchmetric;
   an add, compare and select (ACS) circuit for estimating a maximum likelihood sequence (MLS) in response to an output of said branchmetric compute circuit means, and outputting a result of estimation;
   a delay circuit for delaying said received signal by a demodulation time in which said result of estimation is outputted;
   a received signal regenerating filter for regenerating and outputting said received signal in response to an output of said ACS circuit;
   a filter control circuit means for updating, in response to an output of said delay circuit, an output of said received signal regenerating filter, and internal states of said received signal regenerating filter, said internal states of said received signal regenerating filter such that a difference between said output of said delay circuit and said output of said received signal regenerating filter decreases; and
   channel impulse response predict circuit means for predicting, in response to an output of said filter control circuit means and by using said output as a past change in said internal states of said received signal regenerating filter, a future path impulse response and outputting a result of prediction as said predicted future channel impulse response.

3. An adaptive channel impulse response estimation system for a digital data communication system which transmits data over a transmission channel, comprising:
   first internal state outputting means for generating, in response to a result of decision, a received signal and an estimated channel impulse response, a replica of said received signal and outputting first internal states;
   control pulse outputting means for detecting a decision error in response to said first internal states and, upon detecting a decision error, outputting a control pulse;
   second internal state outputting means for replacing, in response to said received signal and said first internal states, said first internal states with second internal states to control error propagation when said control pulse outputting means has outputted said control pulse and outputting said second internal states, or outputting said first internal states as said second internal states without replacement when said control pulse outputting means does not output said control signal; and
   estimated value outputting means for updating said second internal states to output said estimated channel impulse response.

4. A system as claimed in claim 3, wherein said first internal state outputting means comprises, where m and n are numerals and $1 \leq m \leq n$:
   a serial connection of n shift registers to which said result of decision is applied;
   a first add circuit for weighting signals stored in said n shift registers by a group of n weights fed via input/output terminals and adding resulted weighted signals;
   a first subtractor for producing an error signal representative of a difference between an output of said first adding circuit and said received signal; and
   output terminals for outputting said signals of said n shift registers, said n weights, and said error signal as said first internal states.

5. A system as claimed in claim 4, wherein said control pulse outputting means detects a level of said error signal, compares said level with a predetermined threshold, and, if said level is greater than said threshold, outputs said control pulse.

6. A system as claimed in claim 4, wherein said second internal state outputting means comprises:
   a control circuit to be enabled by said control pulse;
   a first switch group having m switches for outputting, in response to m signals of said n shift registers ($1 \leq m \leq n$) and outputs of a second switch group having m switches, said m signals of said n shift registers when said control circuit is not enabled or outputting outputs of said second switch group when said control circuit is enabled;

an output terminal group having m output terminal for outputting signals from said first switch group;

a first switch for outputting, in response to said error signal from said first subtractor and an output of a second switch, said error signal when said control signal is not enabled or outputting said output of said second switch when said control circuit is enabled;

a first switch output terminal for outputting a signal from said first switch;

a decision pattern generate circuit enabled by a signal from said control circuit for outputting decision patterns of $L^m$ (L being a number of levels per symbol) different m symbol sequences;

a memory group having n-m memories for storing n-m signals of said n shift registers;

an output terminal group having n-m output terminals for outputting said n-m signals;

a second add circuit means for weighting, by using said n weights of said first add circuit, signals stored in said n-m memory group and n symbol sequences constituted by said decision patterns constituted by said m symbol sequences and adding resulted weighted signals and resulted weighted n symbol sequences;

an output terminal group having n output terminals;

a second subtractor for producing an error signal representative of a difference between an output of said second add circuit means and said received signal;

a first power detect circuit for determining and outputting the power of an output of said second subtractor;

a second power detect circuit for detecting the power of the input signal on receiving the signal stored in said memory;

a comparator for comparing outputs of said first and second power detect circuits and, if said output of said first power detect circuit is greater than said output of said second power detect circuit, causing outputs of said m second switch group to be fed to a third switch having m switches and causing said third switch to output an output of said second switch while, if said output of said first power detect circuit is smaller than said output of said second power detect circuit, causing said output of said decision pattern generate circuit to be fed to said third switch and causing said third switch to output an output of said second subtractor;

said third switch receiving an output of said second subtractor and an output of said second switch and controlled by said comparator;

a memory power for storing the input signal in response to an output of said third switch;

said second power detect circuit detecting power of said signal stored in said memory;

said second switch controlled by said control circuit for applying said signal stored in said memory to said first switch when said decision pattern generate circuit has generated all of said patterns or applying said signal to said third switch when said decision pattern generate circuit is generating any of said patterns;

said third switch controlled by said comparator for selectively outputting either one of an output of said decision pattern generate circuit and outputs of said second switch group;

a memory group having m memories for storing outputs of said third switch; and said second switch group controlled by said control circuit for applying said signals stored in said m memory group to said first switch group when said decision pattern generate circuit has generated all of said patterns or applying said signals to said third switch when said decision pattern generate circuit is generating any one of said patterns.

* * * * *